H. Rosbrook,
Steam-Boiler Fire-Tube.

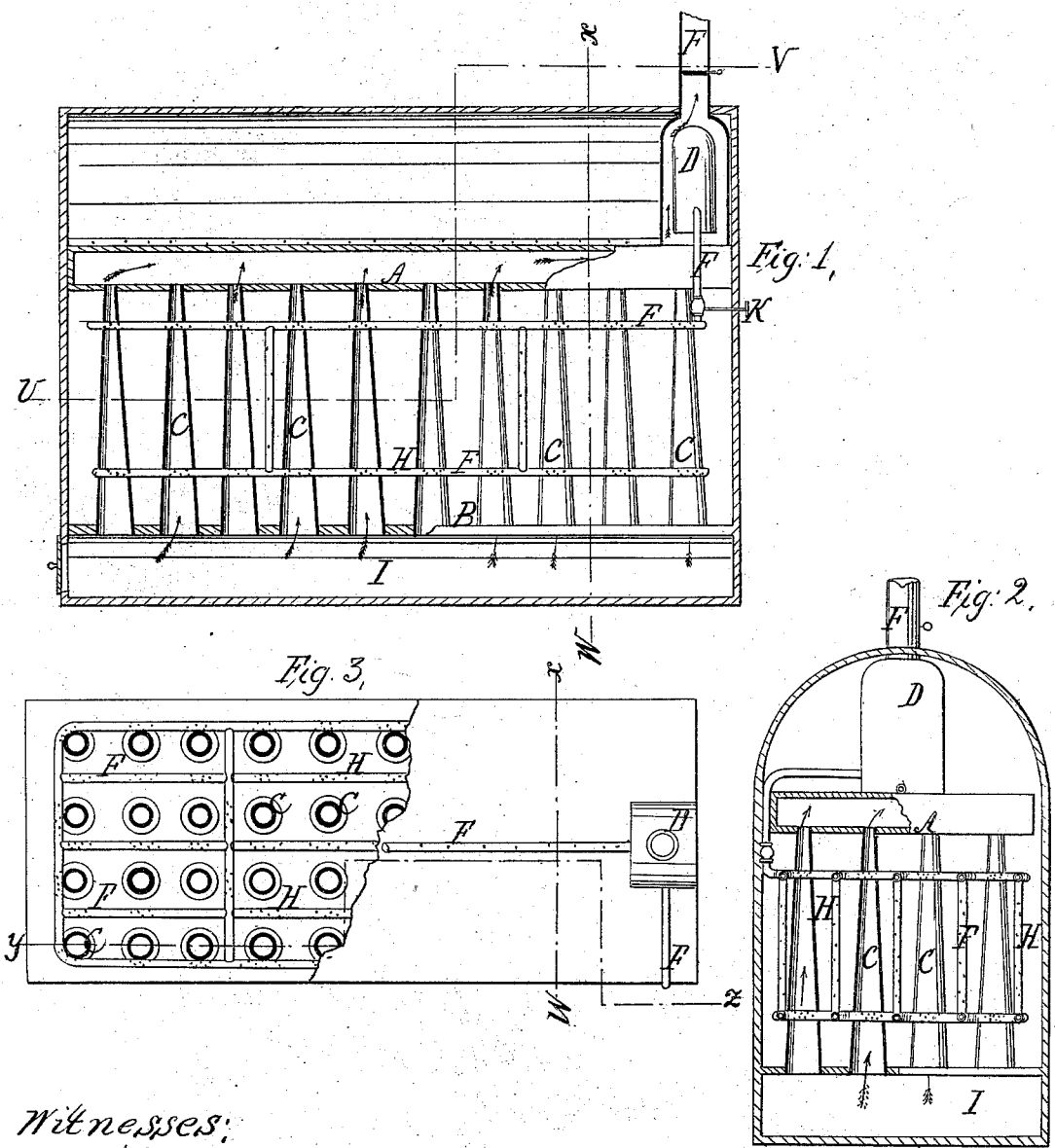

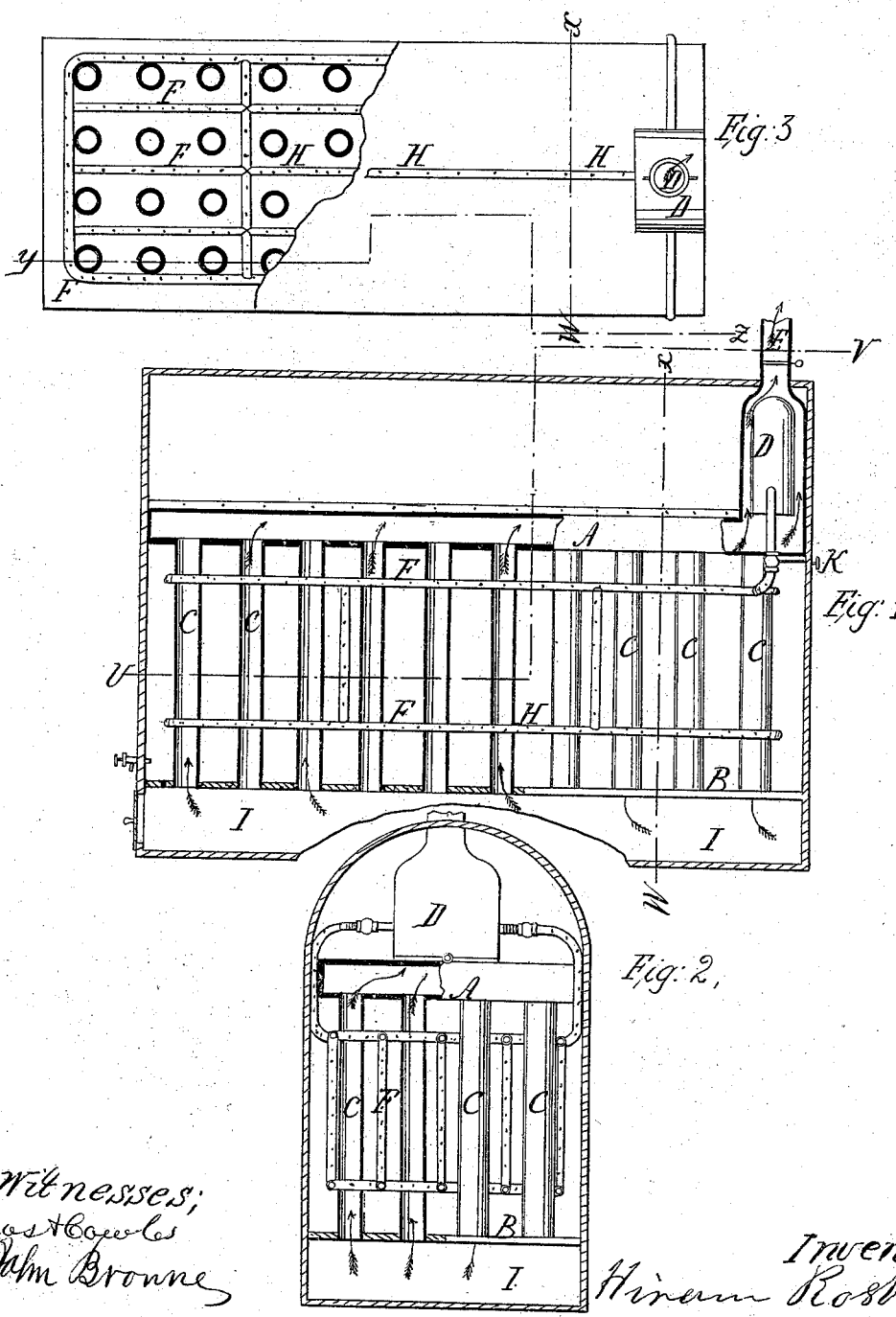

N° 66,397. Patented July 2, 1867.

5 Sheets. Sheet 3.

Witnesses;
Jas H Cowles
John Browne

Inventor
Hiram Rosbrook

H. Rosbrook,
Steam-Boiler Fire-Tube.
N° 66,397. Patented July 2, 1867.

Witnesses:
Jas. H. Cowles
John Browne

Inventor
Hiram Rosbrook

H. Rosbrook,
Steam-Boiler Fire-Tube.
N° 66,397.   Patented July 2, 1867.
5 Sheets. Sheet 5.
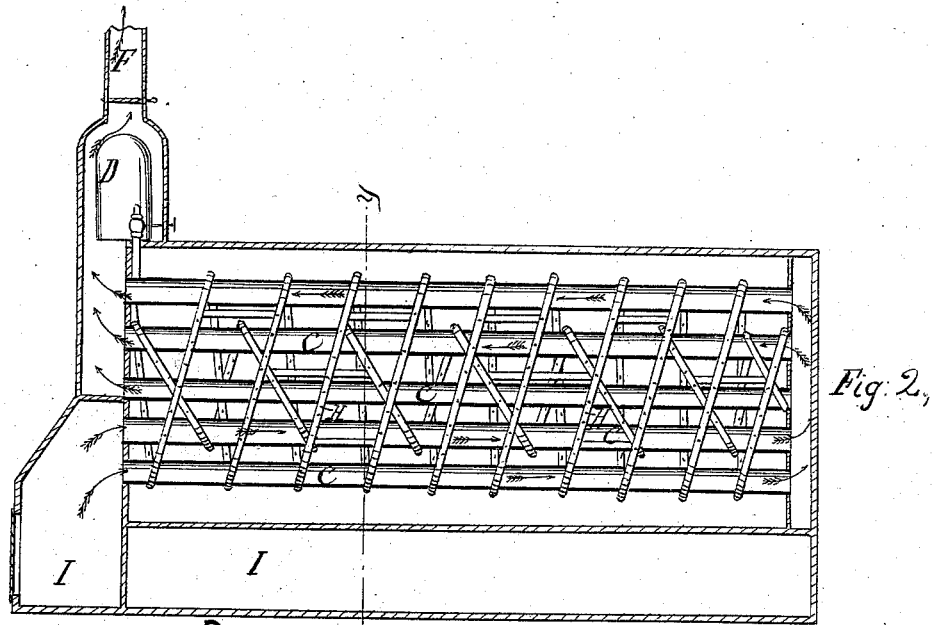
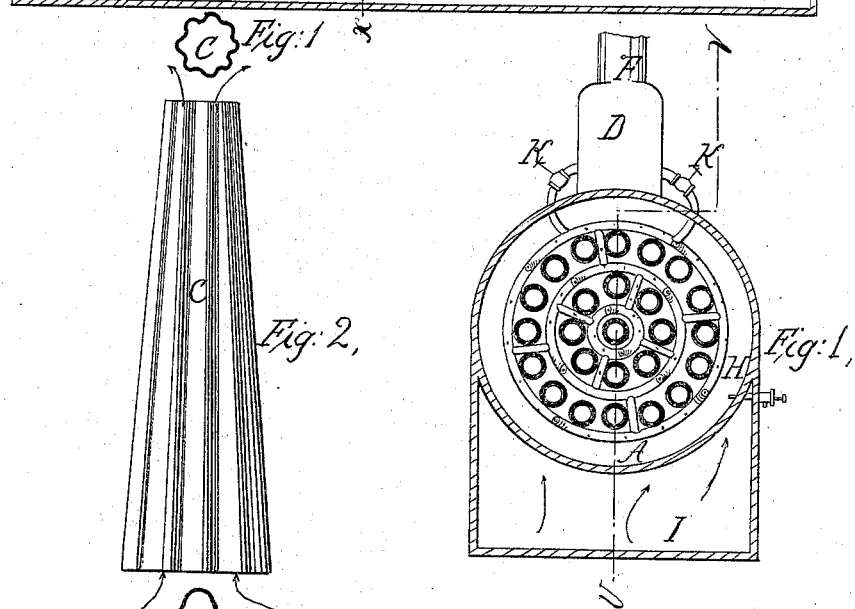
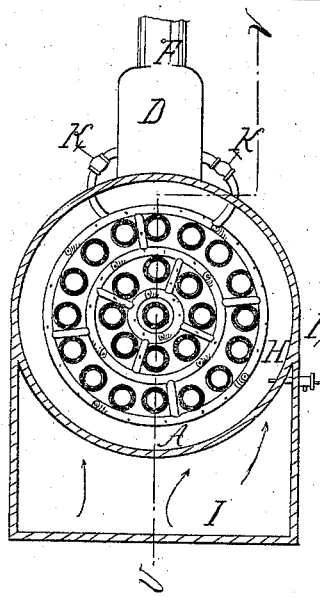
Witnesses:
Jas. H. Cowles
John Brown
Inventor
Hiram Rosbrook

United States Patent Office.

HIRAM ROSBROOK, OF CHICAGO, ILLINOIS.

Letters Patent No. 66,397, dated July 2, 1867.

---

IMPROVEMENT IN STEAM-GENERATORS.

---

*The Schedule referred to in these Letters Patent and making part of the same.*

---

TO ALL WHOM IT MAY CONCERN:

Be it known that I, HIRAM ROSBROOK, of Chicago, in the county of Cook, and State of Illinois, have invented new and useful improvements in Steam-Generators; and I do hereby declare that the following is a full, clear, and exact description of the construction and operation of the same, reference being had to the accompanying drawings, making part of this specification.

Figure 1 of Sheet No. 1 represents a vertical section of one form of my improved steam-generator.

The nature and object of my invention are to construct a steam-generator to generate steam or superheated steam in sufficient quantities to drive an engine of any power desired, by introducing the water within the generator in small quantities at each stroke of the piston, and thus instantaneously converting it into steam or superheated steam.

Figure 1:
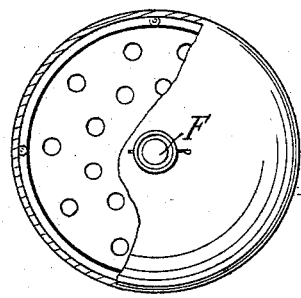
Figure 2:
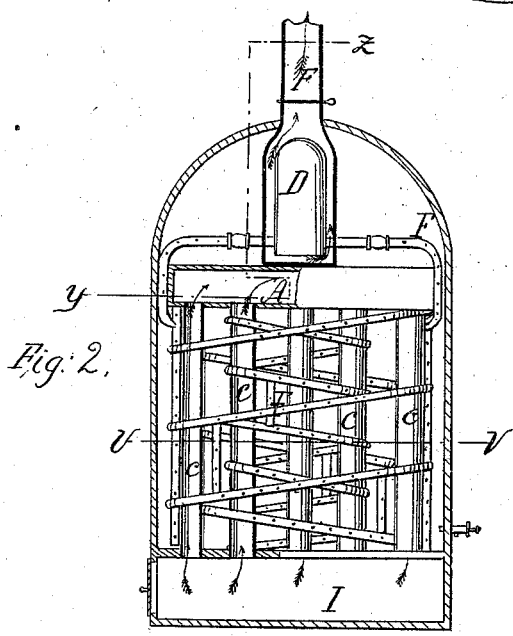
Figure 2 is a vertical end view, taken through line W Z of fig. 1.
Figure 3:
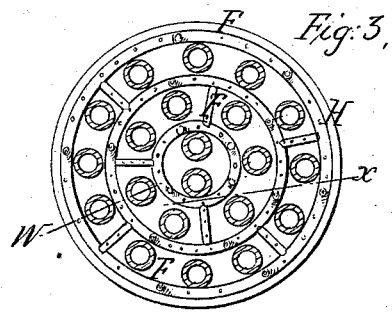
Figure 3 is a top view, taken through line U V of fig. 1.
Figure 1:
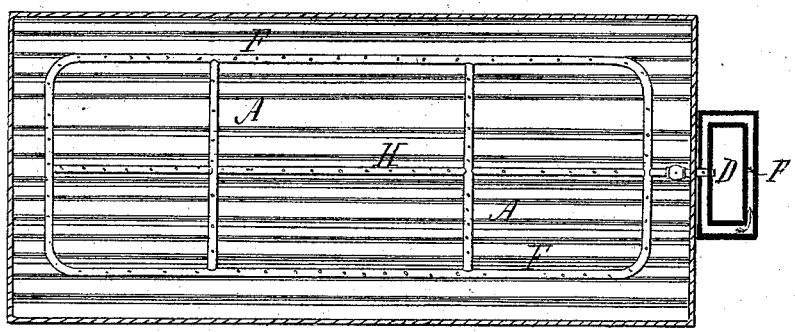
Figure 2:
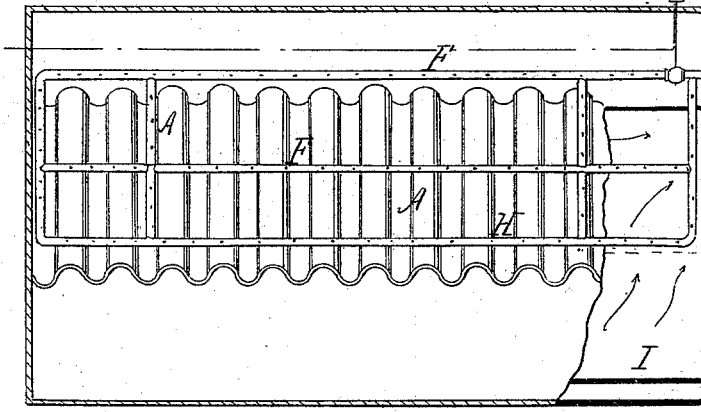
Figure 3:
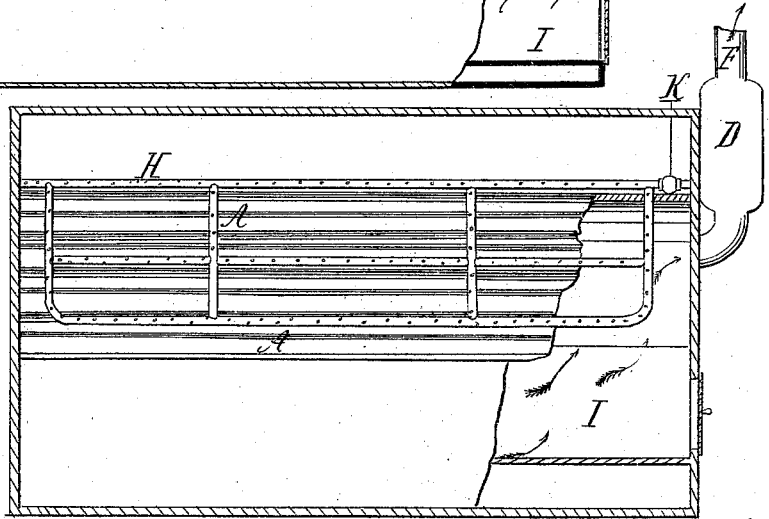

The illustration on Sheet No. 1, fig. 1, represents a generator made in longitudinal form with vertical flues. These flues are set in rows, and slightly conical in form, and I employ any number required. The number employed depends upon the capacity of the generator desired.

A and B, fig. 1, Sheet No. 1, are diaphragms, one of which is located near the top of the generator, and the other near the bottom of the same. The flues C C C extend from one diaphragm to the other, and each flue opens at both ends into the spaces above and below the diaphragms. D is a reservoir for water, located in the chimney E. F is a water pipe leading from the reservoir D, down through the upper diaphragm A, and amid and around the series of flues C C C. The pipe F is punctured with small apertures H H H, of such size and of such number, and in such places as will answer the object desired; it being mainly intended that the apertures shall be so placed as to discharge the water on or near a flue. The fire-box is located at I. K is a stop-cock, located in the pipe F, to cut off the supply of water to this pipe.

The operation of my invention is as follows: The fire is made in the fire-box I, and the heat and flame pass up through the flues C C C, as shown by the arrows. On leaving the tubes the flame and smoke pass in the direction indicated by the arrows at the upper end of the flues, and up through the chimney E, around the reservoir D, thus heating the water. The water is forced from the reservoir D after it is heated, through the pipe F, and out through the various small apertures H H H. The space between the two diaphragms A and B, and exterior to the flues C C C, is kept to a heat of from 300° Fahrenheit to the degree required. The water being discharged from the tube F through the small apertures H H H into this space, is instantly converted into steam or superheated steam, whence it is led through pipes into the cylinder, to discharge its duties.

I do not confine myself to any particular and special arrangement of the pipe F, but reserve the right to locate it as circumstances may require with respect to the flues C C C. It will be observed that in this method of constructing a steam-generator I am enabled to secure a greater or less amount of heating surface, in proportion as I employ a greater or less number of flues C C C. In proportion as are the degrees of heat in the space into which the water is discharged, am I able to convert instantaneously the water into superheated steam. It is a well-known fact that the power of superheated steam is far greater than ordinary steam, and by this method of constructing a steam-generator I am enabled to secure the full advantages of superheated steam, as well as any space desired for making the same.

Sheet No. 2 represents another form, wherein the flues C C C are straight.

Sheet No. 3 represents another form, wherein the flues C C C are arranged in circular form, with the pipe F winding around these flues, as circumstances should require.

On Sheet No. 6 is shown another form of constructing my generator, wherein the flues C C C are horizontal, and the pipe F is led around and through the series, as circumstances should dictate. This form of the generator is constructed with the common return flue.

I make my generator of such material as will answer the purpose, such as common boiler iron. Steel could be used to a great advantage, as the expense of manufacturing steel is being greatly reduced by modern improvements in that art.

Having thus described my invention, what I claim as new, and desire to secure by Letters Patent, is—

1. In a steam-generator the use and employment of the tube F, for the purpose and in the manner substantially as described.

2. Combining the tube F with the flues C C C, in the manner substantially as described.

3. Combining the reservoir D, pipe F, and flues C C C, substantially as described.

HIRAM ROSBROOK.

Witnesses:
JAS. A. COWLES,
JOHN BROWNE.